United States Patent [19]

Werdecker et al.

[11] Patent Number: 5,610,116
[45] Date of Patent: Mar. 11, 1997

[54] CATALYST CARRIER AND METHOD FOR PRODUCING SAME

[75] Inventors: Waltraud Werdecker, Hanau; Rolf Gerhardt, Hammersbach; Wolfgang Krock, Maintal, all of Germany

[73] Assignee: Heraeus Quarzglas GmbH, Hanau, Germany

[21] Appl. No.: 284,500

[22] PCT Filed: Dec. 7, 1993

[86] PCT No.: PCT/EP93/03440

§ 371 Date: Oct. 5, 1994

§ 102(e) Date: Oct. 5, 1994

[87] PCT Pub. No.: WO94/13399

PCT Pub. Date: Jun. 23, 1994

[30] Foreign Application Priority Data

Dec. 15, 1992 [DE] Germany ............ 42 42 227.2

[51] Int. Cl.⁶ ............ B01J 21/08; C04B 35/64
[52] U.S. Cl. ............ 502/232; 264/63; 264/66; 502/240; 502/242; 502/246; 502/254; 502/263; 502/439; 502/527
[58] Field of Search .......... 264/63, 6, 66; 502/439, 527, 240, 232, 242, 246, 254, 263

[56] References Cited

U.S. PATENT DOCUMENTS

| | | | |
|---|---|---|---|
| 4,162,285 | 7/1979 | Tanabashi | 264/66 |
| 4,816,051 | 3/1989 | Clasen et al. | 264/63 |
| 4,996,015 | 2/1991 | Yoshimoto et al. | 264/63 |
| 5,106,549 | 4/1992 | Daamen et al. | 264/63 |
| 5,234,671 | 8/1993 | Gardner-Chavis et al. | 423/235 |
| 5,334,570 | 8/1994 | Beauseigneur et al. | 502/240 |
| 5,385,699 | 1/1995 | Numoto et al. | 264/63 |
| 5,393,604 | 2/1995 | Sanchez | 264/63 |

OTHER PUBLICATIONS

Scholze, "Glas: Natur, Stractur, and Eigenshaften" pp. 128–133 (1977).
Pfaender et al. "Schott Guide to Glass" pp. 18–23 (1980).

*Primary Examiner*—Wayne Langel
*Attorney, Agent, or Firm*—Felfe & Lynch

[57] ABSTRACT

In order to provide a temperature- and acid-resistant catalyst carrier based on a gas-pervious carrier body and a porous surface layer having a high silica content, while dispensing with a washcoat, the carrier body and the surface layer are designed as a chemically and physically homogeneous structure shaped in a single operation. The $SiO_2$ content amounts to at least 99% by weight and has a specific surface from 5 $m^2/g$ to 50 $m^2/g$. In a process for producing a catalyst carrier made of synthetic, amorphous silica particles with more than 99% by weight $SiO_2$, a paste is prepared with the particles, a liquid, and a binder. Plastifying agents are added to the paste and the paste is continuously extruded into a monolithic greenware strand. The alkali and alkaline earth content of the paste is set at no more than 200 ppm and the greenware is cut to length and sintered at a temperature in a range between 800° C. and 1400° C.

19 Claims, No Drawings

CATALYST CARRIER AND METHOD FOR PRODUCING SAME

BACKGROUND OF THE INVENTION

The invention relates to a catalyst carrier a gas permeable support and with a porous surface coating of high silica content. The invention furthermore relates to a method for producing a catalyst support from synthetic, amorphous silica particles with an $SiO_2$ content of more than 99%, by weight, preferably more than 99.5%, the silica particles being made into a plastic dough and the dough being shaped into a greenware and then sintered at high temperature.

Catalysts are used in the chemical and pharmaceutical industry, among other industries, in the manufacture of fine chemicals and for cleaning exhaust gases in industrial plants as well as in gas, gasoline and Diesel engines. The application determines the choice of the materials and the form of the catalyst support. Usually it consists of a support body of a chemically inert material, onto which the catalytically active substance is applied. In general, the greater the surface area, the better the catalyzing action. Therefore support bodies of great specific surface area are preferred. Often, however, the materials suitable as support material do not have the required great specific surface area. In general, the support body is then provided with a surface coating referred to as a "wash coat," which consists of a material of great specific surface area.

A catalyst support of this kind is disclosed in U.S. Pat. No. 3,804,647. In the catalyst support described therein, on the surface of a monolithic, gas-permeable support body, which can consist of a ceramic, glass-ceramic or vitreous composition, a slip coat is deposited, which contains a finely ground, porous borosilicate glass with a content by weight of 96 percent $SiO_2$. After it is applied the slip coat is dried and sintered on tightly at about 800° C. It then serves as a wash coat to increase the specific surface area of the catalyst support. The sintering temperatures and sintering time of the slip coat are coordinated such that any melting of the porous borosilicate glass content will be prevented so as to retain its high specific surface area insofar as possible.

The catalyst support thus prepared can be made with a honeycomb structure and used in conjunction with a catalytic metal coating as an exhaust gas catalyst up to temperatures of about 870° C. However, due to the relatively low resistance of the borosilicate glass content to creeping, the specific surface area of the surface layer quickly decreases, and with it the catalytic effect. On account of its layered construction of materials of different thermal expansion, such catalyst supports have a relatively low strength; especially where high temperatures are used the surface layers spall off. It has also been found that the acid resistance of the support and of the surface layers of the known catalyst supports is insufficient in many applications, such as the cleaning of Diesel motor exhausts containing sulfur dioxide.

Wash coats are widely used which are made on an $Al_2O_3$ basis. These, however, have the disadvantage that the $Al_2O_3$ undergoes a phase conversion at about 700° C. which results in a reduction of the specific surface area such that the specific surface area of the coating tends toward zero. Thus the catalytic activity is also lost.

Basically, for the application of the wash coat, a number of steps are necessary, each requiring a quality assurance step. The process for the manufacture of such catalyst supports is thus expensive and complicated.

German Patent Application DE-A1 39 12 504 discloses a method for preparing a catalyst support in the form of compacts, in which pyrogenically made silicon dioxide particles are homogenized with urea, methyl cellulose, aluminum stearate and/or magnesium stearate as well as graphite, with the addition of water. The dough thus prepared is then dried at a temperature of 80° C. to 120° C. and again crushed to powder. This powder is then pressed to form compacts and heat treated for a period of 0.5 to 8 hours at a temperature of 400° C. to 1200° C.

By the process disclosed in DE-A1 39 12 505 catalyst supports can be made in the form of pill-like compacts in, for example, cylindrical, spherical or annular shapes, with an outside diameter of 2 mm to 15 mm.

Pyrogenically made silicon oxides are characterized by extremely fine particles and an accordingly low space-filling quality. Due to this fineness, shaping them into the known catalyst compacts of simple geometrical shape presents a number of difficulties. The production of catalyst supports with a filigree structure is not possible by the known method.

SUMMARY OF THE INVENTION

The present invention is addressed to a gas-permeable, heat- and acid-resistant catalyst support in which the application of a wash coat can be dispensed with, as well as a simple method of manufacturing catalyst supports resistant to fracture and creep continuously and at low cost.

According to the invention as regards the catalyst support that the support body and the surface layer form a chemically and physically uniform structure which is shaped in one common procedure, has an $SiO_2$ content of at least 99 wt. %, and has a specific surface area between 5 $m^2/g$ and 50 $m^2/g$. Since the support body and the surface layer form a chemically and physically uniform structure shaped in one common procedure, any flaking off of the surface layer is excluded. The catalyst support has a chemically uniform structure in which tensions caused, for example, by materials of different thermal expansion coefficients when the temperature changes, cannot occur. For this use of the catalyst support according to the invention in the cleaning of exhaust gases a gas-permeable structure is necessary. Particularly in the case of cleaning exhaust gases in the automotive field catalyst supports with a honeycomb structure have become popular. The production of such a structure, wherein the support body and the surface coating are formed in a common procedure, is possible by extrusion, for example.

On account of the high $SiO_2$ content of the surface coat and support body, of at least 99 wt. %, the catalyst support can be used, on the one hand, at high temperatures such as, for example, 1000° C. and more, and on the other hand can be used even in an environment requiring high acid-resistance, without the occurrence of any marked alterations of the support and surface coat.

Since the specific surface area of the catalyst support is between 5 $m^2/g$ and 50 $m^2/g$, surface areas can be obtained that are sufficiently great for many applications, even if the catalytic substances are applied directly to the surface coat on the catalyst support according to the invention. The specific surface area is established at a maximum of 50 $m^2$. It has been found that pieces with a specific surface area up to 50 $m^2/g$ have sufficient mechanical strength and at the same time a favorable pore distribution for catalytic purposes. The formation of micropores contributing to a greater consumption of noble metals but not participating in the catalytic process is suppressed.

A catalyst support with a specific surface area ranging between 15 m²/g and 30 m²/g has proven especially advantageous. This range has proven desirable especially with an eye to a sufficiently great surface area of the catalyst support with no additional wash coat, combined with as low a consumption as possible of catalytically active coating material.

Particularly for great mechanical strength and high chemical resistance to acids, a catalyst support has proven desirable in which the $SiO_2$ content is at least 99 wt. % and the alkali and alkaline earth content is established at a level of no more than 200 ppm, preferably no more than 50 ppm. The low alkali and alkaline earth content permits the catalyst support to be sintered from powder of high silicic acid content at relatively high temperatures without observing any formation of cristobalite and the accompanying destruction or weakening of the sintered catalyst support. The relatively high sintering temperatures, however, contribute to a high mechanical strength of the catalyst support, as is needed in many applications, such as the cleaning of automotive exhaust gas.

Catalyst supports which contain metal oxides of Groups III to VI of the transition metals and rare earths have proven to be especially creep resistant. Also, the doping on of metal oxide in the form of aluminum oxide has proven valuable in this regard. Such metal oxides contribute not only to the stabilization of the specific surface area but also to the fixation of the alkali traces remaining in the glass, thereby also improving the mechanical stability of the catalyst support. Such catalyst supports are used especially in the conduct of processes in which the preservation of the catalytic effect at high temperatures is more important than chemical acid-resistance. It has proven advantageous, however, to limit the total content of metal oxides to no more than 5000 ppm.

In regard to the manufacturing process, plasticizers are added to the composition and the composition is pressed to form a monolithic greenware strand, wherein the composition's combined content of alkali and alkaline earth is established at not more than 200 ppm, preferably not more than 50 ppm, and the greenware is sintered at a temperature in the range between 800° C. and 1000° C.

The addition of plasticizers permits the strand of greenware to be made by the continuous strand pressing method known in connection with ceramic compositions.

However, it is essential to the suitability of the composition for forming a honeycomb catalyst support appropriate for high temperatures and having a high resistance to fracture that the alkali and alkaline earth content of the composition be established at a maximum of 200 ppm, preferably at no more than 50 ppm, and that the greenware be sintered at a temperature in the range between 800° C. and 1400° C. With this content of alkali and alkaline earth, it has been found that the formation of cristobalite, which otherwise is to be expected in sintering at relatively high temperatures, and the resultant destruction or weakening of the sintered body against mechanical stress, is prevented and the required specific surface area is maintained. The relatively high sintering temperatures assure, on the other hand, a high mechanical strength in the sintered catalyst supports, combined with great specific surface area.

Prior to sintering, the greenware strand is usually dried and, if necessary, cleaned.

A process has proven to be especially advantageous in which the greenware is sintered at a temperature in the range between 950° C. and 1150° C. A high mechanical strength is thereby achieved, as well as temperature stability at the correspondingly high application temperatures.

The use of pyrogenically made silica particles is especially suitable for the production of a catalyst support by the method of the invention. These are characterized by extreme fineness and a correspondingly great specific surface area, very high purity, uniform particle shape, and the absence of internal porosity. Powders of pyrogenic silica particles with a specific surface area between 50 m²/g and 100 m²/g have proven to be especially appropriate.

A process in which silica particles with a mean diameter in the range between 10 nm and 40 nm are used has proven to be especially advantageous. Such powders are characterized by a high sintering activity and enable the production of catalyst supports with great specific surface areas.

It is expedient to use agglomerated silica particles in the process. These agglomerated silica particles can be calcined, preferably at temperatures between 500° and 1200° C.

The agglomeration is performed preferably by spray drying, by which very uniform, fine granules can be produced. Using a pressure nozzle and a suspension of low solid content, virtually spherical hollow granules of little shell thickness can be produced. These hollow granules are partially destroyed in the extrusion process and provide good toothing (stiffness) in the extrusion composition without negatively affecting the extrusion.

It can furthermore be advantageous to use a mixture of agglomerated and unagglomerated silica particles. The use or addition of agglomerated silica particles brings the advantage that the extruded composition has better stability of shape (greater stiffness), and after extrusion shows less tendency to sag (deform of its own weight). Another advantage is that the drying can be done faster without the risk of shrinkage cracking. The occurrence of shrinkage cracking is reduced overall.

In the sintering of the greenware strand, the temperature, the holding time and the atmosphere are preferably selected such that the catalyst support has, after sintering, a specific surface area between 5 m²/g and 50 m²/g, preferably between 15 m²/g and 30 m²/g. With such specific surface areas it is possible in the case of many areas of application to dispense with the wash coat usually applied to the surface, whereby a suitable specific surface area is prepared for the subsequent coating with the catalytically active metal. The method of the invention is appropriate especially for the extrusion of catalyst supports with a honeycomb structure, such as those used for cleaning exhaust gases of automobiles, especially in the case of acid exhausts of Diesel engines.

DETAILED DESCRIPTION OF THE PREFERRED EMBODIMENTS

The catalyst according to the invention, and the method of its manufacture will be further explained below with the aid of exemplary embodiments.

Embodiment 1

A plastic dough is prepared from the following substances:

4252 g of pyrogenic silica with a BET surface area of 50 m²/g and a total alkali content of less than 34 ppm, 3087 g of deionized water with a conductivity of 1 S.

190 g of methyl cellulose with a total alkali content of less than 600 ppm, 80 g of fatty acid with a total alkali content of less than 100 ppm, 25 g of polyglycol with a total alkali content of less than 20 ppm.

The dough thus prepared is mixed for 15 minutes in a Z-arm kneader and then extruded with a piston extruder to a monolithic greenware strand with a honeycomb structure. For this purpose a round nozzle with a square cell structure is used. The cell density is 400 cells per square inch. Greenware strands with a diameter of 40 mm and a length of 1000 mm are extruded. These are then cut into 300 mm lengths and dried in a microwave oven. For sintering, the lengths are heated in a sintering furnace with a temperature rise rate of 5° C./min to a temperature of 1050° C., and held at this temperature for 30 minutes. The air feed into the sintering furnace is advantageously set at about 100 l/h and kept constant.

The silica honeycomb bodies thus prepared have a specific surface area of 34 $m^2/g$. As it appears from the weight-parts of the above-listed substances, the silica content of these honeycombs after burning out the organic substances and eliminating the moisture is better than 99.9 wt. %. They can be provided directly with the active catalyst coating without applying the usual wash coat.

Embodiment 2

The same dough composition as in Embodiment 1 is prepared. As additional components 15 g of pyrogenic $Al_2O_3$ with a specific surface area (BET) of 400 $m^2/g$ and 6 g of cerium nitrate are added.

Greenware strands are produced from the plastic composition by the method described in Embodiment 1. They are heated at a temperature increase rate of 5° C./min to a temperature of 1150° C. and held at this temperature for 30 minutes. The air feed into the sintering furnace is set at about 100 l/h and held constant.

The specific surface area of the honeycomb body thus produced amounts to 38 $m^2/g$; its $SiO_2$ content is more than 99.5 wt. %.

Even with this catalyst support the wash coat for increasing the specific surface area can be dispensed with.

By the addition of pyrogenic $Al_2O_3$ a sufficiently great specific surface area is obtained despite the higher sintering temperature. The higher sintering temperature also results in a greater strength in the $SiO_2$ honeycomb, which is suitable also for use at especially high temperatures on account of its great resistance to creep.

Embodiment 3

A greenware strand is extruded in a continuous extruder from a dough made from 4000 g of a suspension consisting of 30wt. % of pyrogenic silica with a BET surface area of 80 $m^2/g$ and an alkali content of 20 ppm, and 70 wt. % of deionized water with a conductivity of 1 μS, 1657 g of pyrogenic silica with a BET surface area of 80 $m^2/g$ and a total alkali content of 20 ppm, 172 g of methyl cellulose with a total alkali content of less than 600 ppm, 80 g fatty acid with a total alkali content of less than 90 ppm, and 23 g polyglycol with a total alkali content of less than 20 ppm after homogenization for 30 minutes in a Z-arm kneader. For this purpose the extruder is equipped with a square nozzle with a cell density of 200 cells per square inch. Honeycomb strands with an edge length of 50 mm and a length of 1000 mm are drawn. These strands are cut to lengths of 200 mm and dried in a convection oven.

Then the pieces thus produced are heated at a rate of temperature rise of about 10° C./min to a temperature of 1000° C. and held at this temperature for 60 minutes.

The honeycomb bodies thus made have a specific surface area of 28 $m^2/g$; they can also be provided directly with a catalytically active coating.

Embodiment 4

Using the following substances:

of pyrogenic silica with a BET surface of 100 $m^2/g$ and a total alkali content of less than 10 ppm 30 of pyrogenic $Al_2O_3$ with a BET surface of 400 $m^2/g$ 400 g of spray granules of a hollow shape with an average grain size of 150 μm, prepared from pyrogenic silica with a BET surface of 100 $m^2/g$, calcined at 800° C. in air 3100 g of deionized water with a conductivity of 0.2 μS 190 g of methyl cellulose with a total alkali content of less than 300 ppm 80 g of fatty acid with a total alkali content of less than 100 ppm 25 g of polyglycol with a total alkali content of less than 20 ppm a homogeneous dough is prepared in a polymer-lined intensive mixer equipped with knife heads, and is then extruded in a continuous extruder to a greenware strand. To this end the extruder is equipped with an oval nozzle with a cell density of 600 cells per sq. inch. Honeycomb strands 1 m long are made. The honeycomb strands are cut into 200 mm lengths and dried in a microwave oven. The pieces thus made are heated up to 460° C. at a temperature increase rate of 4° C./min and held at this temperature for 60 minutes; then they are heated at a temperature rise of 10° C./min to 1300° C. and held at this temperature for 30 minutes.

The honeycomb pieces thus made have a specific surface area of 48 $m^2/g$. They can be provided directly with a catalytically active coating without applying a wash coat.

The honeycomb pieces thus made can be used at temperatures up to 1000° C. with additional exposure to acid, without damage.

We claim:

1. Catalyst support comprising a gas-permeable support body with a porous surface layer wherein the support body and the surface layer form a chemically and physically uniform structure shaped in one common procedure and having an $SiO_2$ content of at least 99 wt. % and a specific surface area between 5 $m^2/g$ and 50 $m^2/g$, said support body having an alkali and alkaline earth content of no more than 200 ppm.

2. Catalyst support according to claim 1 wherein said specific surface area is between 15 $m^2/g$ and 30 $m^2/g$.

3. Catalyst support according to claim 1 wherein said $SiO_2$ content is at least 99.5 wt. %.

4. Catalyst support according to claim 1 wherein said support body contains oxides of metals of at least one of groups III to VI, the transition metals and rare earth elements.

5. Catalyst support according to claim 4 wherein said support body contains aluminum oxide.

6. Catalyst support according to claim 5 wherein the total metal oxide content is up to 5000 ppm.

7. Catalyst support according to claim 1 wherein the support body has a honeycomb configuration.

8. Method for preparing a catalyst support comprising the following steps forming a plastic dough comprising silica particles having an $SiO_2$ content of at least 99.5%, a fluid, a binding agent, and plasticizers, said dough having an alkali and alkaline earth content of not more than 200 ppm, extruding said dough to form a monolithic greenware, and sintering said greenware at a temperature in the range of 800° C. to 1400° C.

9. Method according to claim 8 wherein the greenware is sintered at a temperature in the range between 950° C. and 1150° C.

10. Method according to claim 8 the silica particles are made pyrogenically.

11. Method according to claim 8 the silica particles have a mean diameter of 10 to 40 mm.

12. Method according to claim 8 the silica particles with a specific surface area between 50 $m^2$/g and 100 $m^2$/g are used.

13. Method according to claim 8 wherein the greenware is extruded in the shape of a honeycomb.

14. Method according to claim 8 wherein agglomerated silica particles are used.

15. Method according to claim 14 wherein the agglomerated silica particles are calcined.

16. Method according to claim 15 wherein the agglomerated silica particles are calcined between 500° and 1200° C.

17. Method according to claim 14 wherein the agglomerated silica particles are produced by spray drying.

18. Method according to claim 17 wherein hollow granules are produced by the spraying drying.

19. Method according to claim 8 wherein a mixture of agglomerated and unagglomerated silica particles is used.

\* \* \* \* \*

UNITED STATES PATENT AND TRADEMARK OFFICE
CERTIFICATE OF CORRECTION

PATENT NO. : 5,610,116
DATED : March 11, 1997
INVENTOR(S) : WERDECKER et al.

It is certified that error appears in the above-identified patent and that said Letters Patent is hereby corrected as shown below:

On the cover, in the section titled "Other Publications", line 1, change "Stractur and" to --Structur und--.

In column 1, line 7, between "gas" and "permeable" add a hyphen, - - - - -.

In column 1, line 8, after "support" add -- body --.

In column 6, line 15, before "of" add --3000 g--.

In column 6, line 17, after "30" add -- g --.

Signed and Sealed this

Thirty-first Day of August, 1999

Attest:

Q. TODD DICKINSON

Attesting Officer

Acting Commissioner of Patents and Trademarks